United States Patent
Hars et al.

(10) Patent No.: US 9,876,641 B2
(45) Date of Patent: Jan. 23, 2018

(54) DATA DEPENDENT AUTHENTICATION KEYS FOR DIFFERENTIAL POWER ANALYSIS RESISTANT AUTHENTICATION

(71) Applicant: The Boeing Company, Chicago, IL (US)

(72) Inventors: Laszlo Hars, Lafayette, CO (US); Donald P. Matthews, Jr., Longmont, CO (US)

(73) Assignee: THE BOEING COMPANY, Chicago, IL (US)

( * ) Notice: Subject to any disclaimer, the term of this patent is extended or adjusted under 35 U.S.C. 154(b) by 147 days.

(21) Appl. No.: 14/878,404

(22) Filed: Oct. 8, 2015

(65) Prior Publication Data

US 2017/0104594 A1    Apr. 13, 2017

(51) Int. Cl.
| | | |
|---|---|---|
| H04L 29/06 | (2006.01) | |
| H04L 9/08 | (2006.01) | |
| H04L 9/32 | (2006.01) | |
| H04L 9/00 | (2006.01) | |

(52) U.S. Cl.
CPC ........... *H04L 9/0861* (2013.01); *H04L 9/003* (2013.01); *H04L 9/3242* (2013.01)

(58) Field of Classification Search
USPC ........................................................ 713/189
See application file for complete search history.

(56) References Cited

U.S. PATENT DOCUMENTS

| | | | | |
|---|---|---|---|---|
| 9,526,005 | B2* | 12/2016 | Wallis | .............. H04W 12/06 |
| 2010/0246815 | A1* | 9/2010 | Olson | .............. G06F 7/483 |
| | | | | 380/29 |
| 2010/0316217 | A1 | 12/2010 | Gammel et al. | |
| 2011/0138192 | A1* | 6/2011 | Kocher | .............. G06F 21/602 |
| | | | | 713/189 |
| 2013/0195266 | A1* | 8/2013 | Fischer | .............. H04L 9/003 |
| | | | | 380/44 |

OTHER PUBLICATIONS

Extended European Search Report dated Feb. 23, 2017 in corresponding European Patent Application No. 16192969.0.
U.S. Appl. No. 14/472,978, filed Aug. 29, 2014 to Hars.
U.S. Appl. No. 14/473,006, filed Aug. 29, 2014 to Hars.
U.S. Appl. No. 14/473,042, filed Aug. 29, 2014 to Hars.
"Counter mode (CTR)," 2015, Wikipedia article—http://en.wikipedia.org/wiki/CTR_mode#CTR [Sep. 3, 2015], 14 pages, (see pp. 10-11).
"Output Feedback mode (OFB)," 2015, Wikipedia article—http://en.wikipedia.org/wiki/Output_feedback#OFB [Sep. 3, 2015], 14 pages, (see pp. 9-10).

(Continued)

*Primary Examiner* — Jason Lee
(74) *Attorney, Agent, or Firm* — MH2 Technology Law Group LLP

(57) ABSTRACT

A system and method for using mixing functions to generate and manipulate authentication keys based on the data being decrypted to mitigate the effect of side channel attacks based on differential power analysis (DPA). The mixing function may be based on a XOR tree, substitution-permutation networks, or double-mix Feistel networks. The mixing function uses some secret key material, which diversifies its behavior between different instantiations.

16 Claims, 6 Drawing Sheets

MIXING FUNCTION USING A DOUBLE-MIX FEISTEL NETWORKS BASED KEY GENERATOR

(56) References Cited

OTHER PUBLICATIONS

"XTS encryption mode," 2015, Wikipedia article—http://en.wikipedia.org/wiki/XTS_mode#XEX-based_tweaked-codebook_mode_with_ciphertext_stealing_.28XTS.29 [May 11, 2015], 6 pages, (see pp. 3-4).

"SHA-2," 2015, Wikipedia article—http://en.wikipedia.org/wiki/SHA-2 [Oct. 7, 2015], 13 pages.

"Message authentication code," 2015, Wikipedia article—http://en.wikipedia.org/wiki/Message_authentication_code [Oct. 7, 2015], 4 pages.

\* cited by examiner

DATA DEPENDENT AUTHENTICATION KEYS FOR DIFFERENTIAL POWER ANALYSIS RESISTANT AUTHENTICATION

TECHNOLOGICAL FIELD

The present disclosure relates generally to data encryption modes and, in particular, to an improved system for generating authentication keys that uses mixing functions to scramble information leaking in side channels from devices to mitigate the effect of attacks based use of differential power analysis (DPA).

BACKGROUND

The aviation industry largely depends on the reliable functioning of critical information technology infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections, data transmission, and computing systems.

The secrecy and integrity of stored or transmitted data can be generally assured by cryptographic means when no adversary has physical access to the electronic devices processing the data. This is because during the operation of such devices, some information about secret keys or sensitive data always leaks in side channels, including variation of response times, fluctuation of power use, or ultrasonic or electromagnetic wave radiation. In order to optimize security, fast encryption modes with reduced side channel leakage are needed that do not significantly increase processing time, system complexity, the size of electronic circuits, or energy usage.

Encrypted data stored in unprotected media, and messages transferred in open channels, can be manipulated by adversaries. If a Message Authentication Code ("MAC") (which is computed from the encrypted data/ciphertext) is attached to the message or to the stored data, the system can be configured such that tampered data will never be decrypted, which means that no side channel attack can be mounted against the decryption process. However, the authentication process has still to be performed on every data block, including the blocks for the tampered data. This means that side channel attacks could still be feasible against the authentication process. If such attack is successful, an adversary discovers the authentication key which then enables him to create valid MACs for the tampered data. The attacker can use the illegitimately created MACs to create fake messages that cause direct harm. The attacker could also use the illegitimately created MACs to create specially crafted messages facilitating side channel attacks against encryption keys, or for a directed key search.

The MAC in traditional applications is generated and verified by ciphers or hash functions, which use a shared secret key for both the MAC generation and verification. This key stays constant during an attack, because even if the MAC depends on an initial value (IV) included in the message, the adversary can keep that IV and the used authentication key remains unchanged. The adversary may flip bits in the message and observe how the trace of the power versus time changes. This is the ideal circumstance for DPA-type side channel attacks against the message authentication. DPA measures the changing power signals as the device processes and encrypts data. A DPA attack records power traces and groups them by the known input bits of the block cipher.

Thus, it is desirable to have an improved system and method for generating authentication keys that mitigates side channel attacks and that does not significantly increase processing time or energy usage.

BRIEF SUMMARY

In view of the foregoing background, example implementations of the present disclosure provide a system for improving the security of a device including a mixing unit that generates a first authentication key for a first segment of data, the first authentication key being dependent on a first ciphertext corresponding with the first segment of data, and generates a second authentication key for a second segment of data, the second authentication key being dependent on a second ciphertext corresponding with the second segment of data. The first authentication key is different from the second authentication key. The system further includes a message authentication code (MAC) generator that generates a first MAC based on the first authentication key and a second MAC based on the second authentication key.

The mixing unit maps the first segment of data's block size input with the first segment of data's block size output. If the first segment of data has a bit length that is shorter than the bit length of the first authentication key, parts of the first segment of data are repeated to fill an input buffer of the mixing unit or remaining bits of the input buffer are set to a fixed value. If the first segment of data has a bit length that is longer than the bit length of the first authentication key, the mixing unit truncates the first authentication key by dropping unneeded bits or XORing the unneeded bits to some of the used bits. The first segment of data is hashed to align with an input buffer of the mixing unit. The mixing unit is invertible, non-linear, and may be a XOR tree mixing unit, substitution-permutation mixing unit, or double-mix Feistel mixing unit. The system further includes a key rolling unit that cooperates with the mixing unit.

In another implementation of the present disclosure, a system for improving the security of a device is provided that receives data, uses a mixing function to generate an authentication key based on a segment of data, applies encryption to the segment of data, and processes remaining segments of the data with the encryption while applying the mixing function to create new authentication keys for each segment of data.

In yet a further implementation of the present disclosure, a method for improving the security of a device is provided that includes the steps of generating with a mixing unit a first authentication key for a first segment of data, the first authentication key being dependent on such first segment of data, and generating with the mixing unit a second authentication key for a second segment of data, the second authentication key being dependent on such second segment of data.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
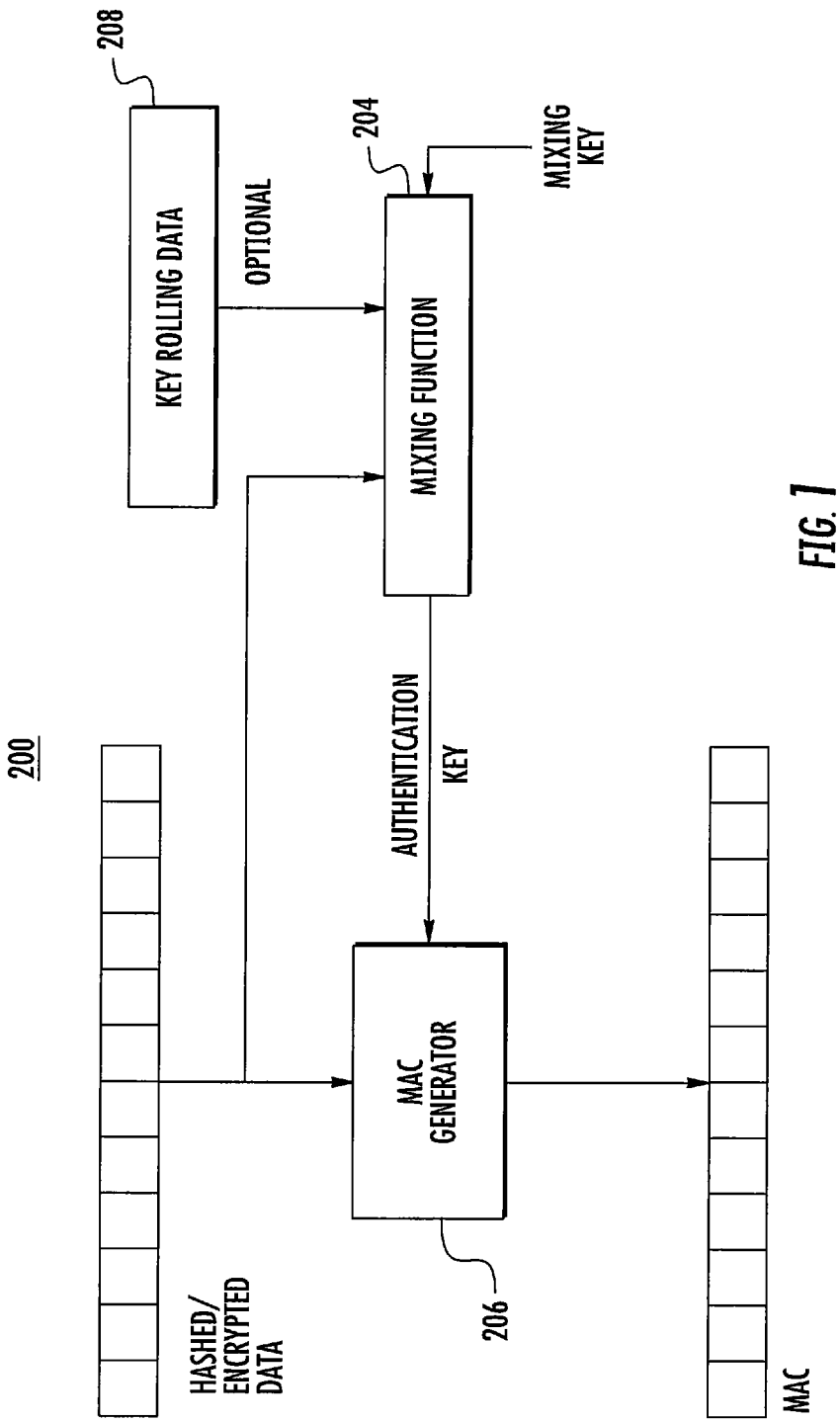
FIG. 1 is a logic diagram of a data dependent authentication key generation system in accordance with an example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

According to example implementations of the present disclosure, the present invention is an improved system and method for generating authentication keys while reducing side channel leakage in devices. It should be understood that while the disclosure provided herein is in the context of encrypting messages, the present disclosure may be likewise applied to data stored in unprotected media, like RAM, Flash memory, or disk drives.

As shown in FIG. 1, the data dependent authentication key generation system 200 includes a MAC generator 206. The authentication key that is input to the MAC generator 206 is dependent on the protected data itself (the ciphertext). This system 200 is effective because, for message authentication, the inverse of the authentication function is not needed. Rather, verification of a message involves generating a new authentication tag of the received message and comparing it to the received authentication tag. If the tags are not equal, such inequality is an indication that the message has changed since the sender generated the MAC. Because the MAC is generated and verified with secret keys, an adversary is not able to create valid MACs for altered data.

In order to prevent the data dependent key generator from becoming a target for a side channel attack, the key generation is scrambled with a mixing function 204, referred to herein as MIX, which is described in more detail below. The mixing function 204 is very fast and, for example, takes no more than a single clock cycle.

Many security systems employs "key rolling," which involves periodically changing the encryption and authentication keys to reduce the number of messages encrypted or authenticated with the same key. This is a countermeasure against side channel attacks that is mounted when an adversary could see side channel leakage over a large number of messages. As shown in FIG. 1, modifying the data dependent authentication key may be performed together with any key rolling processes (key rolling unit 208), in which case no additional processing time is needed.

In order to provide parallel functionality, the data dependent authentication key generation system 200 may use several types of mixing functions 204 that are fast and thorough, meaning that any single bit change in the data flips (in the average) about half the bits of the generated key, such that a DPA-type attack on the MAC generator will not find criteria for clustering power traces.

When either the input or the output of a mixing function 204 is hidden from an attacker, the attacker cannot mount traditional cryptologic attacks or side-channel attacks, such as DPA-type attacks. Thus, the fast mixing functions 204 are ideal for cryptographic key generation, including secret keys producing other secret keys.

The mixing functions 204 used in data dependent authentication key generation system 200 have the following properties:
1. They map n-bit input to n-bit output (n=block size).
2. The mixing depends on a large amount of secret key material, which can be generated from a single key and/or a random number generator.
3. The mixing function is bijection (invertible).
4. Every input bit influences every output bit in non-linear way.
5. Every nonempty set of input bits also influences every output bit (no effect cancels).

Figure 3:
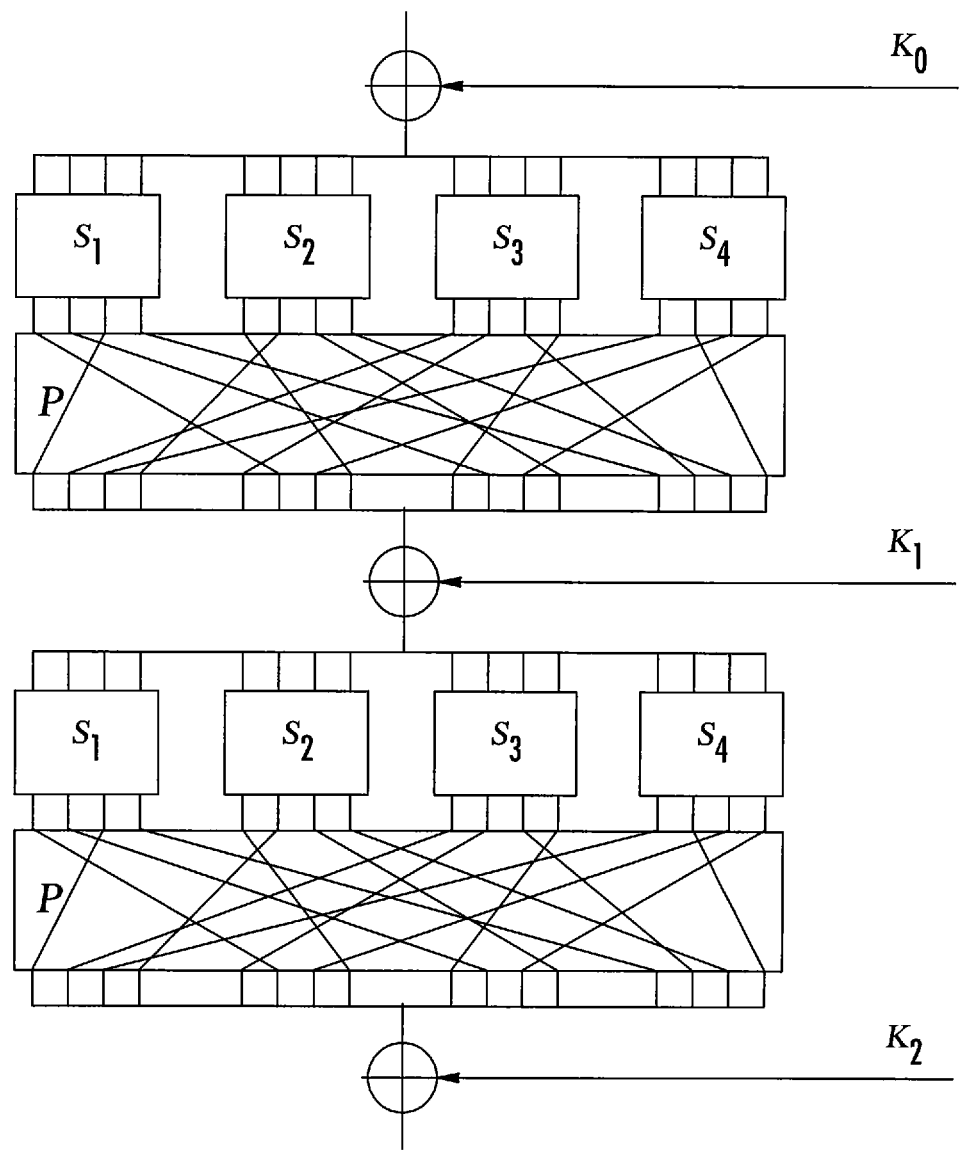
FIG. 3 is a logic diagram of a substitution-permutation network based key generator for a mixing function in accordance with an example implementation of the present disclosure.
Figure 4:
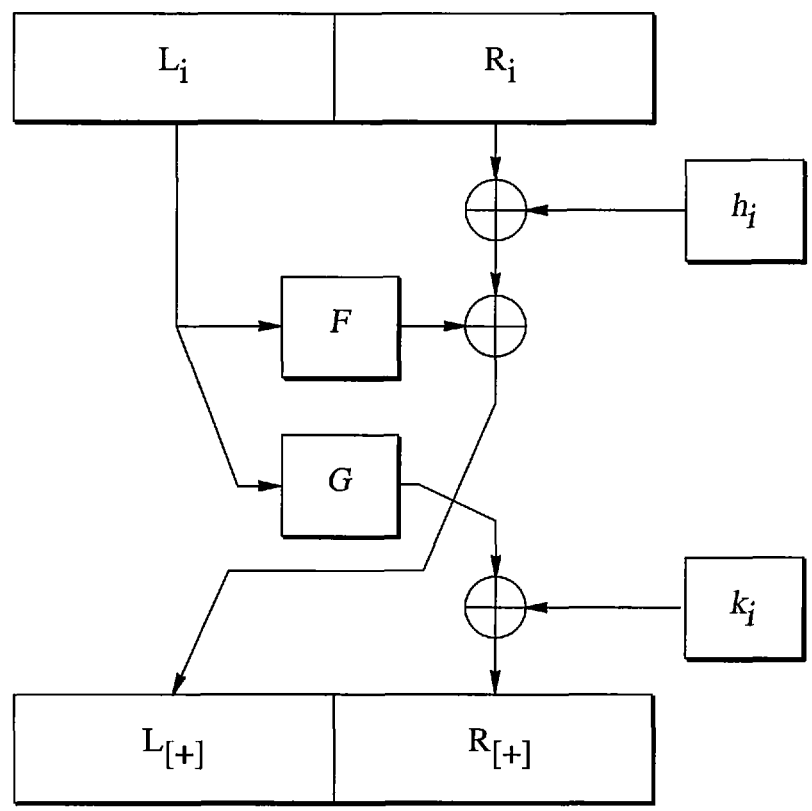
FIG. 4 is a logic diagram of a double-mix Feistel network based key generator for a mixing function in accordance with an example implementation of the present disclosure.

According to example implementations of the present disclosure, suitable mixing functions for use in the data dependent authentication key generation system 200 are XOR trees (FIG. 2), substitution-permutation networks (FIG. 3), and double-mix Feistel networks (FIG. 4). The non-linearity of the mixing functions 204, as referenced above, may be provided by arithmetic additions of shifted data or S-Boxes, which can degenerate to (N)AND/OR gates (2×1 bit S-Boxes). These mixing functions 204 use secret key materials. When two input parameters are supplied, the second parameter replaces a part of the first mixing subkey.

Figure 2:
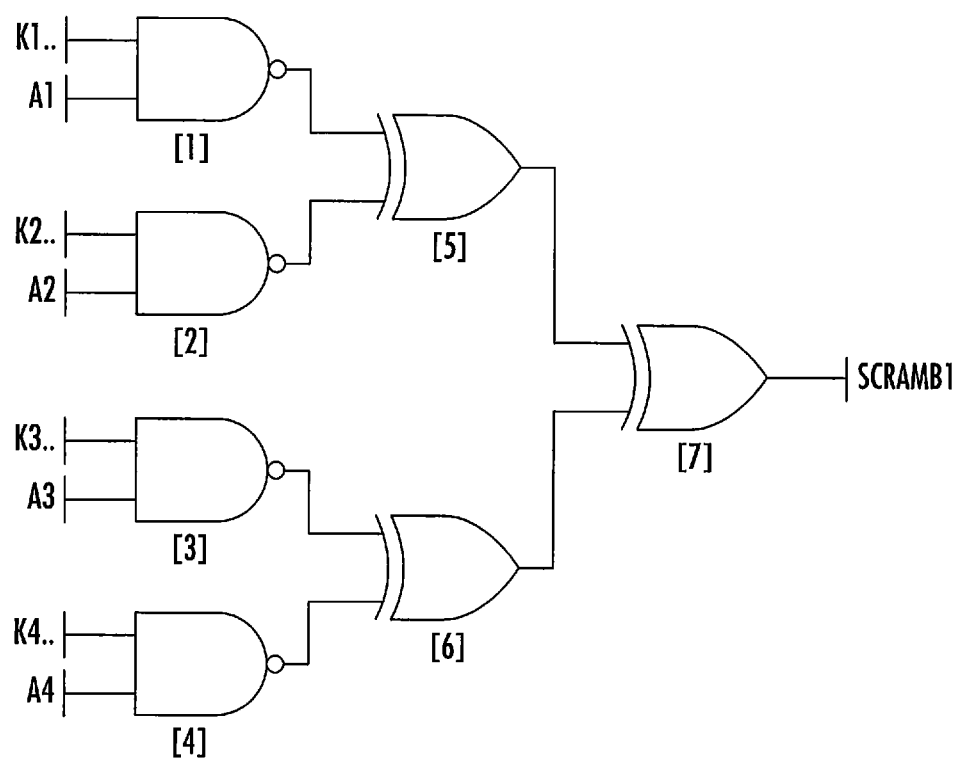
FIG. 2 is a logic diagram of a XOR tree based key generator for a mixing function in accordance with an example implementation of the present disclosure.

Referring now to FIG. 2 regarding the mixing function 204 using a XOR tree based key generator, the input bits A1, A2, A3 . . . select corresponding subkeys K1, K2, K3 . . . to XOR. The final scramble operation step makes the construction non-linear and can be comprised of rotate-add operations, or a series of nonlinear S-Box operations. The XOR tree based key generator may further include additional input selects, including rotated subkeys.

Referring now to FIG. 3 regarding the mixing function 204 using a substitution-permutation network based key generator, the input bits are fed in from the top of the logic diagram, and the output is taken from the bottom of the logic diagram. The subkeys $K_1$, are independent randomly created secrets. $S_1$, $S_2$ . . . are S-Boxes, which are small, non-linear substitution functions. The number of layers of the mixing network is chosen to be at least twice of the full mixing depth (when every input bit effects every output bit).

Referring now to FIG. 4 regarding the mixing function 204 using a double-mix Feistel network based key generator, F is a non-linear, very difficult (or impossible) to invert function, whereas G is invertible. In implementations with parallel operating electronic circuits, the mixing performance of the Feistel network is double that of the traditional Feistel networks. $[L_0, R_0]$ is the input of the mixing function and the output is taken from the bottom of the logic diagram. The number of layers of the mixing network is chosen to be as high as fits to a single clock-cycle requirement.

The foregoing-described mixing functions 204 may be employed as hardware solutions. However, the data dependent authentication key generation methods as disclosed herein can also be employed as software running on single or multi-core central processing units, albeit at slower speeds and, thus, with lower security.

The mixing functions 204 are intended for authentication key generation dependent on the address and possibly on data version information (write counter) and on a large pool of secret key material to assist with diversification between deployed systems. However, the mixing functions 204 could also operate on other data.

The mixing functions 204 produce output of the same length as of their input. The authentication key is typically 256 bits long, but the message data to be authenticated can also be shorter or longer. While the example below refers to 256 bit keys, it should be understood that the mixing functions 204 could naturally extend to any other key size.

If the message is the same length or shorter than the authentication key (32B), parts of the message can be repeated to fill the 256 bit input buffer of the mixing function 204, or any unused bits can be set to a fixed value, like 0.

Another scenario is when the message data to be authenticated is longer than 256 bits (32B), but not longer than 512 bits. The proportionally scaled mixing function 204 generates a key that is too long. This key can be truncated by either dropping unneeded bits, or XORing these bits to some of the kept bits.

There are opportunities for optimization. For example, 256 bit mixing function 204 may be used as follows: The first 256 data bits of the message constitute the input of the mixing function 204, and the excess bits get XORed to the first or second round key of the mixing function 204.

When the message data is longer than 64B, it is first hashed to 256 bits. A suitable hash function is the NIST standardized SHA-256, but there are many other published hash functions that would suffice. The digest of the hash is then exactly 256 bits long so it fits perfectly to the input buffer of the 256 bit mixing function 204.

For moderate length messages the system 200 gets rid of the initial slow hashing when blocks of 256 bits of the message are XORed to the first few round keys of the mixing function 204. In order to optimize quality of the mixing function 204, not many of the round keys can be modified by XORed message data. Rather, each such XORed bit still has to affect all output bits of the mixing function 204. Practical upper limits for the length of the message may be 3 to 5 times 32B.

The data dependent authentication key generation system 200 as described herein is thus very useful in situations where an attacker can observe side channel leakages from the encryption or decryption devices. This is because the authentication key is generated dependent on the data itself. As changing data enters the system 200 no large amounts of leaked information can be correlated to sensitive data or cryptographic keys. This results in significantly improved system security.

In addition to the data dependent authentication key generation system 200 improving the security of standard encryption modes, use of such data dependent authentication key generation system 200 is low cost and does not significantly increase circuit size, power usage, or processing time. Compared to known encryption systems with key rolling methods for protection from side channel analysis attacks, when the data dependent authentication key generation system 200 is used, the encryption or decryption speed and also the power consumption decreases about two fold. Therefore, slower electronic components can be used, which further reduce the energy consumption of the corresponding computing system without compromising security. Example computer systems include flight computers, military and space programs, corporate networks, personal and laptop computers, smart mobile devices, even secure communication networks.

According to example implementations of the present disclosure, the various components of the scrambled tweak mode encryption engine 200 may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the data dependent authentication key generation system 200 and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system 100 of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of data dependent authentication key generation system 200. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 5:
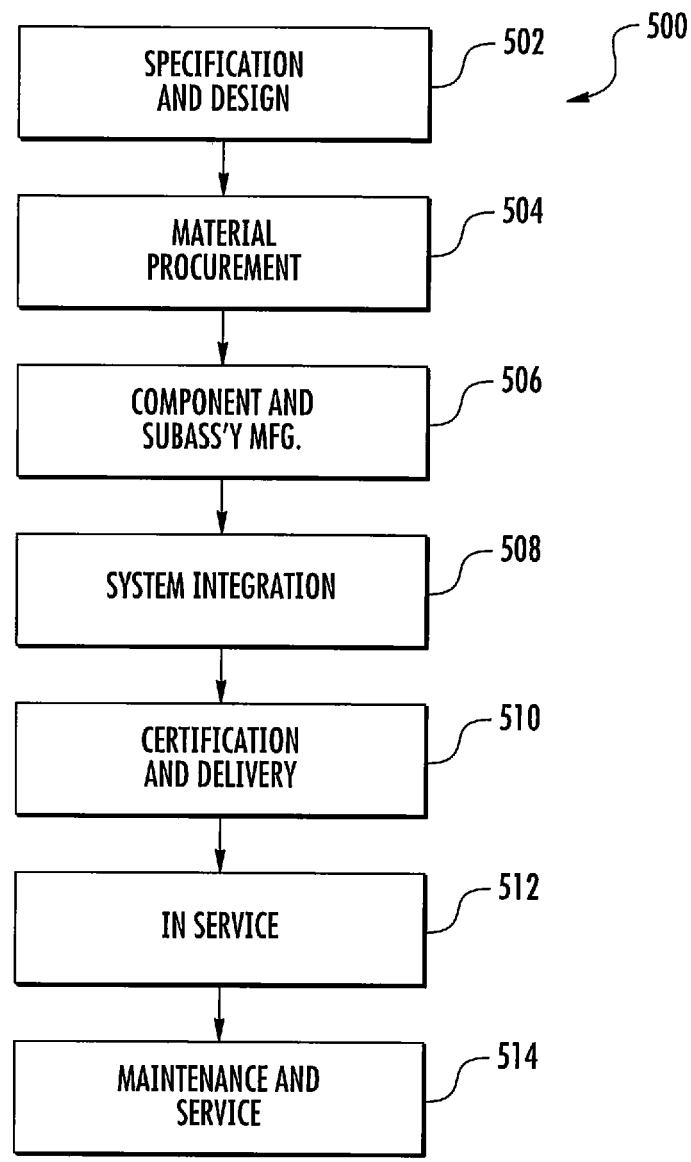
FIG. 5 is a block diagram of aircraft production and service methodology.
Figure 6:
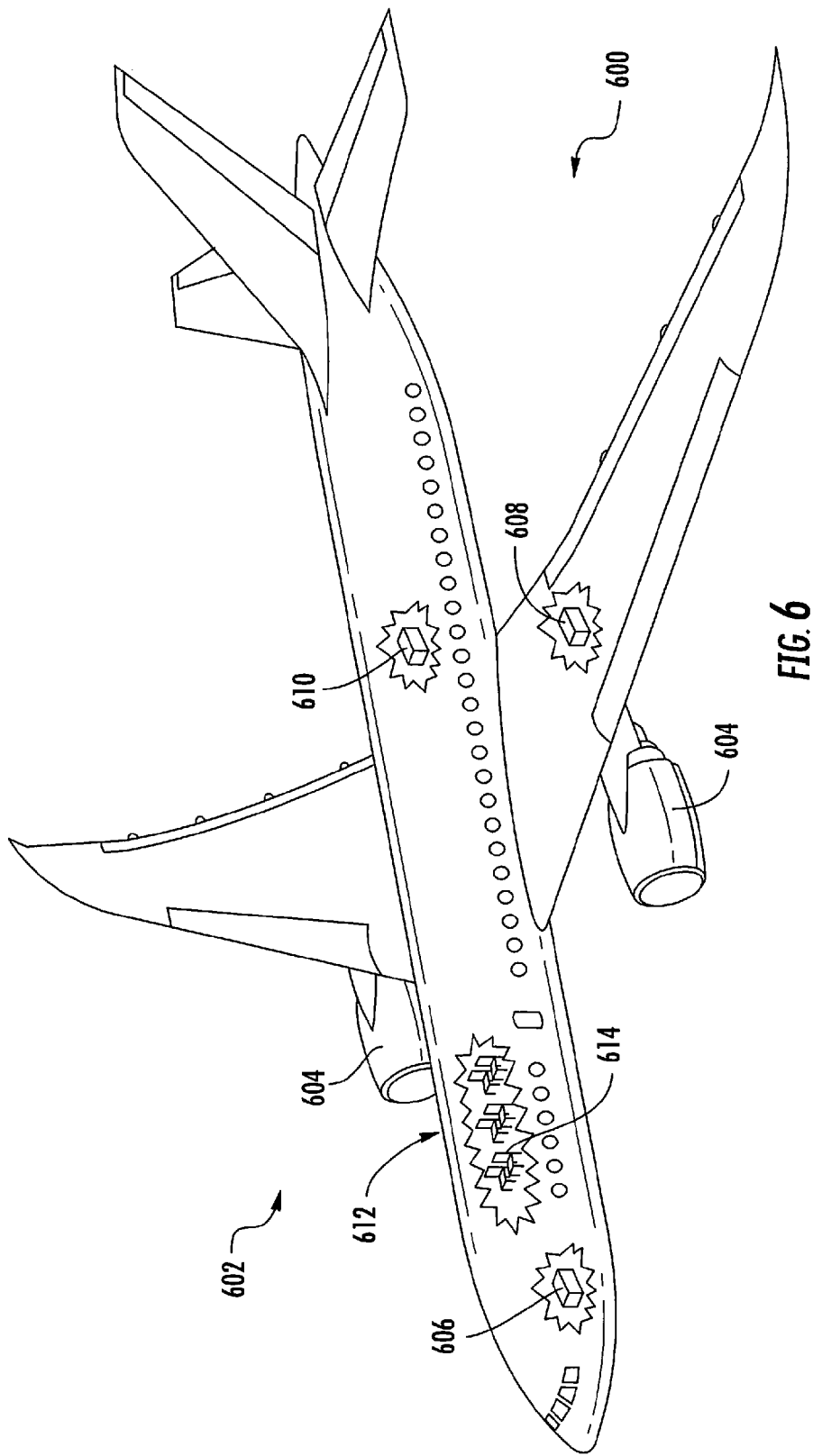
FIG. 6 is a schematic illustration of an aircraft.

As referenced above, examples of the present disclosure may be described in the context of aircraft manufacturing and service. As shown in FIGS. 5 and 6, during pre-production, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for improving security of a device comprising:
    a mixing unit that:
    generates a first authentication key for a first segment of data, the first authentication key being dependent on a first ciphertext corresponding with the first segment of data; wherein if the first segment of data has a bit length that is shorter than the bit length of the first authentication key, parts of the first segment of data are repeated to fill an input buffer of the mixing unit or remaining bits of the input buffer are set; and wherein if the first segment of data has a bit length that is longer than the bit length of the first authentication key, the mixing unit truncates the first authentication key by dropping unneeded bits or XORing the unneeded bits to at least one or more of the used bits; and
    generates a second authentication key for a second segment of data, the second authentication key being dependent on a second ciphertext corresponding with the second segment of data;
    wherein the first authentication key is different from the second authentication key.

2. The system of claim 1 further comprising a message authentication code (MAC) generator that generates a first MAC based on the first authentication key and a second MAC based on the second authentication key.

3. The system of claim 1 wherein the mixing unit maps the first segment of data's block size input with the first segment of data's block size output.

4. The system of claim 1 wherein the first segment of data is hashed to align with an input buffer of the mixing unit.

5. The system of claim 1 wherein the mixing unit is invertible.

6. The system of claim 1 wherein the mixing unit is non-linear.

7. The system of claim 1 wherein the mixing unit is selected from the group consisting of a XOR tree mixing unit, substitution-permutation mixing unit, and double-mix Feistel mixing unit.

8. The system of claim 1 further comprising a key rolling unit that cooperates with the mixing unit.

9. A method for improving security of a device comprising the steps of:
    generating with a mixing unit a first authentication key for a first segment of data, the first authentication key being dependent on such first segment of data; wherein if the first segment of data has a bit length that is longer than a bit length of the first authentication key, repeating parts of the first segment of data to fill an input buffer of the mixing unit or setting remaining bits of the input buffer; and wherein if the first segment of data has a bit length that is longer than the bit length of the first authentication key, truncating the first authentication key by dropping unneeded bits or XORing the unneeded bits to at least one or more of the used bits; and
    generating with the mixing unit a second authentication key for a second segment of data, the second authentication key being dependent on such second segment of data;
    wherein the first authentication key is different from the second authentication key.

10. The method of claim 9 further comprising the step of generating with a message authentication code (MAC) a first MAC based on the first authentication key and a second MAC based on the second authentication key.

11. The method of claim 9 further comprising the step of mapping the first segment of data's block size input with the first segment of data's block size output.

12. The method of claim 9 further comprising the step of hashing the first segment of data to align with an input buffer of the mixing unit.

13. The method of claim 9 wherein the mixing unit is invertible.

14. The method of claim 9 wherein the mixing unit is non-linear.

15. The method of claim 9 wherein the mixing unit is selected from the group consisting of a XOR tree mixing unit, substitution-permutation mixing unit, and double-mix Feistel mixing unit.

16. The method of claim 9 further comprising the step of a key rolling unit cooperating with the mixing unit.

* * * * *